3,318,981
PREPARATION OF VINYL PHOSPHATES, PHOSPHINATES AND PHOSPHONATES FROM HALOMERCURI CARBONYL COMPOUNDS AND PHOSPHITE-TYPE COMPOUNDS
Philip S. Magee, San Rafael, Calif., assignor to Chevron Research Company, a corporation of Delaware
No Drawing. Filed Sept. 23, 1963, Ser. No. 310,852
7 Claims. (Cl. 260—971)

This invention concerns the preparation of vinyl phosphate, phosphinate and phosphonate esters. More particularly, this invention concerns the reaction of halomercuri derivatives with phosphorus compounds of valence three to prepare vinyl phosphates.

Vinyl phosphates, phosphinates and phosphonates can be prepared smoothly and in good yield by the reaction of α-halomercuri carbonyl compounds with phosphites, phosphonites, and phosphinites. The reaction proceeds according to the following equation:

$$ROPT_2 + XHg\underset{R^2}{\underset{|}{C}}-\overset{O}{\overset{\|}{C}}R^3 \longrightarrow T_2P-O\underset{R^2}{\underset{|}{C}}=\overset{R^1}{\overset{|}{C}}-R^3 + Hg^0 + RX$$

wherein R is aliphatic hydrocarbyl, T is R and/or OR, and $R^1$, $R^2$ and $R^3$ are organic radicals and X is halogen of atomic number 17 to 35, i.e., chlorine and bromine.

The phosphites, phosphonites, and phosphinites used in this reaction are substituted with alkyl groups, wherein the alkyl groups may be the same or different. The alkyl groups will usually vary from about 1 to 12 carbons and more usually of from about 1 to 6 carbons.

As indicated above, α-halomercuri carbonyl compounds have the following formula:

$$XHg\underset{R^2}{\underset{|}{C}}-\overset{O}{\overset{\|}{C}}-R^3$$

wherein $R^1$, $R^2$ and $R^3$ can be hydrogen or hydrocarbyl radicals of from 1 to 12 carbons, more usually of from 1 to 7 carbons; preferably $R^1$, $R^2$ and $R^3$ are hydrogen or methyl. $R^1$, $R^2$ and $R^3$ can be aliphatic, cycloaliphatic or aromatic, but are preferably aliphatic; they can be the same or different. They can be hydrogen, methyl, propyl, phenyl, tolyl, cyclopentyl, etc. X is halogen of atomic number 17 to 35, i.e., chlorine or bromine.

Illustrative of carbonyl compounds (oxocarbonyl), i.e., ketones and aldehydes, within the definition are phenylacetaldehyde, butyraldehyde, cyclohexylformaldehyde, acetophenone, valerophenone, para-tolyl ethyl ketone, etc. While polycarbonyl compounds can be used, e.g., 1,2-dibenzoylethane, adipdialdehyde, etc., these compounds will generally find use only in specific situations when bis-phosphates are desired.

The reaction is simply carried out by bringing together the halomercuri compound and the phosphite ester, preferably in an inert solvent, at room temperature or above and then isolating the resulting product.

As indicated, the reaction can be carried out neat, using the phosphite as solvent, or in the presence of inert solvents. Suitable inert solvents include aromatic hydrocarbons, e.g., benzenes, ketones, e.g., methyl isobutyl ketone, esters and some inert halohydrocarbons, e.g., chlorobenzene.

The temperatures which are used depend on the particular materials being used and will usually be in the range of about 25° to 150° C., more usually in the range of about 50° to 100° C. Frequently, the boiling point of the solvent will serve as the temperature control.

Precautions to remove air (oxygen) from the system are not required.

The ratio of the mercurihalide compound to the phosphite ester will usually be stoichiometric, although this relationship is one of convenience. The amount of materials may vary in a molar ratio of 10:1 to 1:10 in specific instances when one of the materials is more valuable than the other.

The concentrations of the reactants are not critical. Usually, the halomercuri compounds will be only slightly or moderately soluble. A heterogeneous system can be used in which the halomercuri compound continuously goes into solution as the reaction proceeds.

A preferred embodiment of this process utilizes the mercury which is formed in the reaction to regenerate the halomercuri derivatives as follows:

(i) $$(RO)_3P + XHg\underset{R^2}{\underset{|}{C}}-\overset{O}{\overset{\|}{C}}-R^3 \longrightarrow (RO)_2\overset{O}{\overset{\|}{P}}-O\underset{}{C}=\overset{R^1}{\overset{|}{C}}-R^2 + Hg^0 + RX$$

(ii) $$Hg^0 + CH_3CO_3H \longrightarrow Hg(OAc)_2^*$$

(iii) $$Hg(OAc)_2 + R^2-\overset{R^1}{\overset{|}{C}}=\overset{R^3}{\overset{|}{C}}-OAc \longrightarrow AcOHg\underset{R^2}{\underset{|}{C}}-\overset{O}{\overset{\|}{C}}-R^3$$

(iv) $$AcOHg\underset{R^2}{\underset{|}{C}}-\overset{O}{\overset{\|}{C}}-R^3 + MX \longrightarrow XHg\underset{R^2}{\underset{|}{C}}-\overset{O}{\overset{\|}{C}}-R^3 + MOAc$$

$$^*OAc = O\overset{O}{\overset{\|}{C}}CH_3$$

wherein R, $R^1$, $R^2$, $R^3$ and X are as defined previously. M is an alkali metal, usually sodium or potassium (of atomic number of up to and including 19). The reaction to form mercuric acetate with peroxides is reported in Razuvaev et al., Zhur Obschei Khim. 23,589 (1953). The reaction of mercuric acetate with a vinyl acetate is reported in A. N. Nesmeyanov et al., Izvest. Akad Nauk S.S.S.R., Otdel Khim. Nauk, 1949, 587; C.A., 44, 7225 (1950). The reaction of an alkali metal salt and a mercuric acetate to form the halomercuri is also reported in the above reference. By means of reutilizing the mercury, the reaction is particularly attractive because the mercury which is expensive is only required in small amounts and can be repeatedly reused.

The vinyl esters find a variety of uses as insecticides, solvents, monomers, etc.

The following examples are offered by way of illustration and not by way of limitation.

Example 1

Into a reaction vessel was introduced 14 grams (0.05 mole) of chloromercuriacetaldehyde, 8.3 grams (0.05 mole) of triethyl phosphite and 60 ml. of chlorobenzene and the mixture refluxed for 1.2 hours. At the end of this time, gray solid (finely divided mercury) was separated, washed with benzene and the combined benzene solution distilled. The product distilled at 99–104°/20–25 mm., yielding 5.4 grams (60%).

*Analysis.*—Calculated: P, 17.9. Found: P, 16.75.

Example 2

Into a reaction vessel was introduced 57.5 grams (0.20 mole) of bromomercuriacetone and 200 ml. of chloroform. To this mixture was added dropwise 33.2 grams (0.20 mole) of triethyl phosphite with stirring. When addition was completed, the mixture was then refluxed for 20 minutes. Celite was added, followed by filtering to remove the mercury. The chloroform solution was then distilled with some mercury forming in the pot. (The reaction was not complete.) The product distilled at 50.5–51.5°/0.1 mm. mercury, yielding 28.0 grams (72%) of diethyl isopropenyl phosphate.

*Analysis.*—Calculated: P, 15.94. Found: P, 15.25.

The present process is particularly advantageous in avoiding the use of α-haloaldehydes and ketones. These compounds are particularly difficult to handle or store and are irritating to the skin.

As will be evident to those skilled in the art, various modifications on this process can be made or followed, in the light of the foregoing disclosure and discussion, without departing from the spirit or scope of the disclosure or from the scope of the following claims.

I claim:

1. A method for preparing a compound having the formula

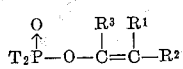

which comprises contacting a compound of the following formula:

wherein R is an alkyl group of from 1 to 12 carbons and T is selected from the group consisting of R and RO with an α-halomercuri carbonyl compound of the following formula:

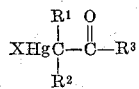

wherein $R^1$, $R^2$ and $R^3$ are selected from the group consisting of hydrogen and hydrocarbyl radicals of from 1 to 12 carbons and X is a halogen of atomic number 17 to 35.

2. A method according to claim 1 wherein the reaction is carried out in the presence of an inert solvent and at a temperature in the range of about 25 to 150° C.

3. A method according to claim 2 wherein said α-mercurihalocarbonyl compound is α-chloromercuriacetaldehyde.

4. A method for preparing dialkyl vinyl phosphates which comprises contacting trialkyl phosphite, wherein said alkyl groups are of from 1 to 6 carbons, with α-chloromercuriacetaldehyde in the presence of an inert solvent at a temperature in the range of about 50 to 100° C.

5. A method for preparing di-hydrocarbyl vinyl phosphates which comprises contacting trialkyl phosphite, wherein said alkyl groups are of from 1 to 12 carbons, with an α-halomercuri carbonyl compound of the following formula:

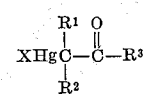

wherein $R^1$, $R^2$ and $R^3$ are selected from the group consisting of hydrogen and hydrocarbyl radicals of from 1 to 12 carbons and X is a halogen of atomic number 17 to 35.

6. A method for preparing a compound having the formula

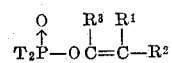

which comprises contacting a compound having the formula

wherein R is an alkyl group of from 1 to 12 carbons and T is R or RO with an α-halomercuri carbonyl compound having the formula

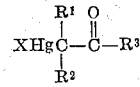

wherein $R^1$, $R^2$ and $R^3$ are hydrogen or aliphatic hydrocarbyl radicals of from 1 to 7 carbons and X is halogen of atomic number 17 to 35.

7. The method of claim 6 wherein the aliphatic hydrocarbyl radicals are methyl.

No references cited.

CHARLES B. PARKER, *Primary Examiner.*

F. M. SIKORA, A. H. SUTTO, *Assistant Examiners.*